United States Patent [19]

Maruta et al.

[11] Patent Number: 4,968,576

[45] Date of Patent: Nov. 6, 1990

[54] RESINOUS MICROPARTICLES USEFUL IN POWDERY TONER FOR ELECTROPHOTOGRAPHY

[75] Inventors: Masayuki Maruta; Katsuaki Kida; Eio Hisajima; Akio Kashihara; Naoya Yabuuchi, all of Osaka, Japan

[73] Assignee: Nippon Paint Co., Ltd., Osaka, Japan

[21] Appl. No.: 297,939

[22] Filed: Jan. 17, 1989

[30] Foreign Application Priority Data

Jan. 14, 1988 [JP] Japan .................................. 63-6545
Feb. 9, 1988 [JP] Japan ................................. 63-29753
Sep. 27, 1988 [JP] Japan ............................... 63-243531

[51] Int. Cl.$^5$ .......................... G03G 9/08; C08F 4/04
[52] U.S. Cl. .................................... 430/110; 526/217; 526/219.1; 526/909; 430/111
[58] Field of Search ............... 450/111, 110, 904, 137; 526/217, 219.1, 909

[56] References Cited

U.S. PATENT DOCUMENTS

| | | | |
|---|---|---|---|
| 2,478,006 | 8/1949 | van Peski | 526/217 X |
| 2,599,300 | 6/1952 | Upson | 526/219.1 |
| 3,080,351 | 3/1963 | Querfurth | 526/217 X |
| 3,857,824 | 12/1974 | Atkins | 526/217 X |
| 3,914,340 | 10/1975 | Dekking | 526/219.1 X |
| 4,125,700 | 11/1978 | Graham | 526/909 X |
| 4,205,152 | 5/1980 | Mizuguchi et al. | 526/923 X |
| 4,260,713 | 8/1981 | Tanaka et al. | 526/219.1 X |
| 4,845,007 | 7/1989 | Hyosu et al. | 430/137 |
| 4,868,086 | 9/1989 | Ohtani et al. | 430/137 |

FOREIGN PATENT DOCUMENTS

| | | | |
|---|---|---|---|
| 57-45558 | 3/1982 | Japan | 430/109 |
| 60-186851 | 9/1985 | Japan | 430/111 |
| 60-186854 | 9/1985 | Japan | 430/110 |
| 60-186856 | 9/1985 | Japan | 430/111 |
| 60-186858 | 9/1985 | Japan | 430/111 |
| 60-186866 | 9/1985 | Japan | 430/111 |
| 60-186875 | 9/1985 | Japan | 430/111 |
| 792812 | 4/1958 | United Kingdom | 526/217 |

*Primary Examiner*—Roland E. Martin
*Attorney, Agent, or Firm*—Wenderoth, Lind & Ponack

[57] ABSTRACT

Resinous microparticles useful in toner for electrophotography which are made of vinyl resin obtained by emulsion polymerization of at least one α,β-ethylenically unsaturated monomers in the presence of cationic surfactant having an onium salt structure and a polymerization initiator having an amidine or amidine salt structure and whose average particle diameter is in a range of from 0.01 to 1μ, and toner composition comprising toner particles and resinous microparticles as abovementioned are provided.

4 Claims, No Drawings

RESINOUS MICROPARTICLES USEFUL IN POWDERY TONER FOR ELECTROPHOTOGRAPHY

Field of the Invention

The present invention relates to resinous microparticles capable of improving flowability of powders and especially toner to be used in electrophotography, electrostatic recording and the like. More specifically, it concerns resinous microparticles having positive charging ability.

Background of the Invention

Among the various methods capable of forming visible image from the electric latent image or electric signal, the so-called dry-developing process has been widely used because a simple device can be used for that process with a safety operation and thus obtained image is stable for many copy cycles.

However, the toner used in that dry-developing process is required to be excellent in powder flowability from the viewpoints of image quality and cyclic stability of the image.

As a measure for improving flowability of the toner, inorganic powder as silica, alumina, titanium dioxide powder has heretofore often been added onto the toner surfaces.

Recently, it has also been frequent adopted to treat the surface of such inorganic powder with various materials capable of improving moisture absorption of such powder as, for example, silane coupling agent, silicone oil and various surfactants. Furthermore, employment of fluorine polymer particles with a uniform diameter has also been proposed as, for example, silane coupling agent, silicone oil and various surfactants. Furthermore, employment of fluorine polymer particles with a uniform diameter has also been proposed as, for example, in Japanese Patent Publication (unexamined) Sho 61-275768.

On the other hand, with the different intention of preventing deficient cleaning, Japanese Patent Publication (unexamined) Sho 60-186851 disclosed the addition of such resinous microparticles as acrylic copolymer or styrene/acrylic copolymer to the toner particles.

However, when the abovementioned microparticles are used with the intention of giving appropriate flowability to the positive charging toner, there are often the cases wherein the charging, of said toner is adversly affected since the most of such microparticles are hardly electrified with positive charge and rather easily electrified with negative charge. Furthermore, at that time, if the particle size is as large as 0.3 $\mu$m or more a, comparatively larger quantity of resinous particles are required for the desired level of flowability and as a consequence, there arises a trouble in that the resinous particles are liable to leave the toner surface and contaminate charge toner as carrier, sub-system member and the like, thereby spoiling the cyclic stability of the copied image.

When the resinous microparticles with an average particle diameter of as small as less than 0.3 $\mu$m, prepared by using a surfactant, are used for the purpose of improving the flowability of the toner, the abovementioned problem is solved, but when the selection of polymerization initiator is not appropriate, there is a tendency for the resinous microparticles to cohere together, and the desired flowability can hardly be obtained.

Such resinous microparticles may also be prepared by using a persulfate polymerization initiator as disclosed in Japanese Patent Publication (unexamined) Nos. Sho 60-186851 and 60-186868 and however, when such resinous microparticles are used together with toner particles, the desired positive charging toner can hardly be obtained because the resinous microparticles thus prepared are liable to be negatively charged. It is, therefore, an object of the invention to provide resinous microparticles which have positive charging ability and are capable of bestowing an appropriate flowability on the toner. An additional object of the invention is to provide toner for elecorophotography having an excellent flowability with said resinous microparticles.

Summary of the invention

According to the present invention, the aforesaid objects can be attained with the resinous microparticles prepared by the method wherein $\alpha$, $\beta$-ethylenically unsaturated monomer(s) is(are) polymerized by emulsion polymerization, using a cationic surfactant having an onium structure as an emulsifier and a compound having an amidine or amidine salt structure as a polymerization initiator to obtain vinyl resin microparticles having an average particle diameter of from 0.01 to 1 $\mu$m or less.

Examples of the cationic surfactant having an onium salt structure used in the present invention are alkyl trimethyl amine salts, alkyl benzyl trimethyl amine salts, dialkyl dimethyl amine salts, alkyl pyridinium salt, alkyl phosphonium salts and the like.

In order to obtain such positive charging ability, the surfactant must be of a cationic nature and the actual material used and the amount are to be determined by consideration of its its affinity for the monomer used the, emulsion stability during emulsion polymerization and the like.

As the polymerization initiator having an amidine or amidine salt structure, the following are advantageously used:

azoamidine compounds as 2,2'-Azobis(2-methyl-N-phenylpropionamidine), 2,2'-Azobis[N-(4-chlorophenyl)-2-methylpropionamidine], 2,2'-Azobis[N-(4-hydroxyphenyl)-2-methylpropionamidine], 2,2'-Azobis[N-(4-aminophenyl)-2-methylpropionamidine], 2,2'-Azobis[2-methyl-N-(phenylmethyl)-propionamidine]dihydrochloride, 2,2'Azobis[2-methyl-N-2-propenylpropion], 2,2'-Azobis(2-methylpropionamidine), 2,2'-Azobis[N-(2-hydroxyethyl)-2-methylpropionamidine) and the like;

cyclic azoamidine compounds as 2,2'-Azobis[2-(5-methyl-2-imidazolin-2-yl)propane], 2,2'-Azobis[2-(2-imidazolin-2-yl propane], 2,2'-Azobis[2-(4,5,6,7-tetrahydro-1H-1,3-diazepin-2-yl)propane], 2,2'-Azobis[2-(3,4,5,6-tetrahydropyrimidine-2-yl)propane], 2,2'-Azobis[2-(5-hydroxy-3,4,5,6-tetrahydropyrimidine-2-yl)propane], 2,2'-Azobis{2-[1-(2-hydroxyethyl)-2-imidazolin-2-yl]propane} and the like, their hydrochlorides, methane sulfonates, p-toluene sulfonate and other amidine salt compounds.

Examples of $\alpha$, $\beta$-ethylenically unsaturated monomers used in the invention are styrene; $\alpha$-methylene aliphatic monocarboxylic acids or esters thereof as acrylic acid, methyl acrylate, ethyl acrylate, butyl acrylate, 2-ethylhexyl acrylate, dodecyl acrylate, phenyl acrylate, methacrylic acid, methyl methacrylate, butyl methacrylate and the like; N,N-dialkylaminoalkyl(-meth)acrylates as N,N-dimethylaminomethyl(metha)acrylate, N,N-dimethylaminoethyl(meth)acrylate, N,N-diethylaminoethyl(meth)acrylate and the like; N,N-dialkylaminoalkyl(meth)acrylamides as N,N-dimethylaminoethyl(meth)acrylamide, N,N-dimethylaminopropyl(meth)acrylamide and the like; fluorine containing monomers as trifluoro acrylate, perfluoro acrylate and the like; silicon containing monomers and the like. When a carboxyl containing monomer as acrylic acid, methacrylic acid, vinyl benzoic acid and the like is included as a part of said monomers to be polymerized, the thus obtained resinous particles are specifically useful in the present invention because the cyclic stability of the charging of the toner added with said particles is greatly improved. When an amphoionic group containing monomer is included in the resin constituting monomers, with the toner compounded with the present resinous microparticles thus obtained, there hardly occurs any decrease in its developing properties. This is especially true under high temperature and highly humid conditions. This is believed to be due to the fact that said amphoionic groups will absorb humidity under such conditions and exert a kind of buffer effect not to decrease the charge control action.

Examples of such amphoionic group are an aminosulfonic acid type amphoionic group an, amino-carboxylic acid type amphoionic group or a sulfobetaine type amphoionic group represented by the formula:

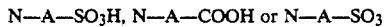

N—A—SO$_3$H, N—A—COOH or N—A—SO$_3$ wherein A represents a linear or branched alkylene having 1 to 6 carbon atoms, phenylene or substituted phenylene group. As the monomers having an aminosulfonic acid- or amino- carboxylic acid-type amphoionic group, mention is made of a monomer prepared by the addition reaction of a benzyl halide and aminosulfonic acid having primary or secondary amino group (e.g. N-(vinylbenzyl)taurine, N-methyl-N-(vinylbenzyl)taurine and the like); and a monomer prepared by the reaction of an oxirane and an aminoacid compound having a primary or secondary amino group (e.g. N-(2-hydroxy-3-allyloxypropyl)taurine, 2-(N-(2-hydroxy-3-allyloxypropyl))taurine, N-(2-hydroxy-3-allyloxy propyl)alanine and the like.

Examples of sulfobetaine type amphoionic group bearing monomers are, as disclosed in Japanese Patent Publication (unexamined) Sho 53-72090, compounds represented by the formula:

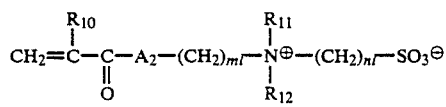

wherein $R_{10}$ represents hydrogen atom or methyl group, $R_{11}$ and $R_{12}$ are the same or different and each represents alkyl group having one to 6 carbon atoms, A is O or NH, and $m_1$ and $n_1$ are the same or different and each represents an integer of 1 to 12, and the compounds represented by the formula:

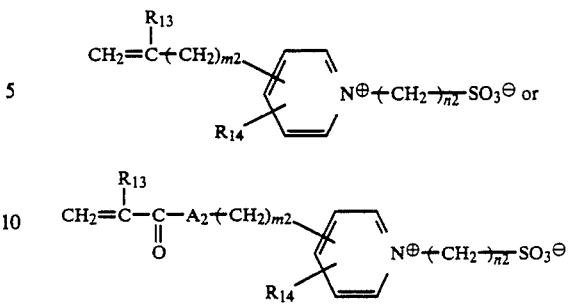

wherein $R_{13}$ is hydrogen atom or methyl group, $R_{14}$ is hydrogen atom or alkyl group having 1 to 3 carbon atoms, $m_2$ is 0 to 6, $n_2$ is an integer of 1 to 6, and $A_2$ has the same meaning as above defined.

The present resinous microparticles may be cross-linked as desired.

For this end, such polyfunctional monomers as divinyl benzene, ethylene glycol dimethacrylate, neopentyl glycol dimethacrylate, trimellitic triallylate and the like may be satisfactorily used.

One or more of the abovementioned monomers may be freely selected as constituting monomers of the present resinous microparticles depending on the desired properties thereof. However, when 2 or more monomers having each different hydrophylic properties are combined together, the thus obtained microparticles show excellent cohesion resistance, and hence are particularly preferred.

After polymerization, the formed emulsion may be subjected to a drying operation with a hot air drier, a freezing drier or the like and the resinous microparticles thus obtained are directly used as they are.

However, when the emulsion is purified by using an ion-exchange resin, or an ultrafiltration device prior to drying, far better properties of the resinous microparticles can be expected therewith.

For the purpose of improving the flowability of the toner, the resinous microparticles added should preferably have an average particle diameter of 0.1 μm or less. The measurement of the particle diameter may be practiced by any conventional means as, for example, direct observation by means of a transmission type electron microscope, a scanning type electron microscope and the like, and indirect methods, such as a light scattering method, a centrifugal settling method and the like.

The present resinous microparticles may be added to any of the heretofore known toners. For example, they may be added to a positive charging toner to improve the flowability thereof. Or, they may be added to ordinary toner without containing any charge controlling agent, thereby giving both flowability and charging properties to the toner.

Furthermore, the present resinous microparticles may be added to a negatively over-charged toner to control the charge level, as well as the appropriate flowability thereof. The toner per se may be prepared by any conventional means as, for example, kneading and pulverizing, spray-drying, emulsion polymerization, suspension polymerization and the like.

As to the adding amount of the present resinous microparticles, it may vary with the average particle diameters of the toner and the resinous microparticles used. For example, when 0.08μ resinous microparticles are added to 2μ toner, the amount of said resinous microparticles is advantageously selected in a range of 0.01 to 5% by weight, preferably from 0.1 to 3% by weight, of the toner weight. If the amount of resinous microparticles is less than the lower limit, one is unable to obtain the desired effects of the invention, and if the amount of resinous microparticles is more than 5% by weight of the toner weight, there is a tendency that the resinous microparticles easily disconnect from the toner surface and contaminate the charge doner as carrier and the sub-system member as the development container. Therefore, the amount actually added should be carefully determined in consideration of the particle diameter of the toner and the diameter of the resinous microparticles, shape and surface conditions of the toner, carrier and the like.

In the addition of the present resinous microparticles to the toner, either of the so-called dry mixing method using a Henshel mixer, a Super mixer, or other high speed mixer, a V-type blender or the like and a wet mixing method wherein the toner is added to an emulsion of resinous microparticles and stirred well may be satisfactorily used.

If the glass transition point of the resinous microparticles is higher than that of the toner, the storage stability of the toner may be improved.

The present resinous microparticles are used by themselves to improve the flowability of toner, but if desired, they may be used together with other conventional additives.

Both of the cationic surfactant having an onium salt structure and the polymerization initiator having an amidine or amidine salt structure are materials having excellent positive-charging characteristics and therefore, by the adoption of this invention, it is possible to provide resinous microparticles with excellent positive charging characteristics. Furthermore, when the above-mentioned two materials are used together in emulsion polymerization of $\alpha, \beta$-ethylenically unsaturated monomers, the thus obtained emulsion is very stable and therefore, can result in resinous microparticles, which are hardly cohesive. Such microparticles are uniformly adhered onto the surface of powdery toner. When the resinous microparticles are prepared from $\alpha, \beta$-ethylenically unsaturated monomers including a carboxyl bearing monomer, the thus obtained microparticles each have a positive charging onium salt and amidine salt having comparatively high charging speeds, as well as a carboxyl group having a comparatively low charging speed.

Therefore, when compounded with toner particles, the cyclic stability of the positive charging of the thus obtained toner is excellent.

When amphoionic groups are present in the resinous microparticles, to be compounded with the toner, excellent environmental stability is given to the present toner. Therefore, at the time when the excess amounts of toners remained on photoconductor are subjected to a cleaning operation, even after 50,000 copying operations, there is no fear of cleaning defect with the present toner. Whereas, with a conventional toner, indeed an effective cleaning can be expected at the early stage, but after 20,000 to 30,000 copying operations, an amount of toner will remain on the photoconductor imagewisely and cause ghost image or a black stripe on the copy. Under high temperature and highly humid conditions, such defects will come to appear at a much earlier stage.

The invention shall be now more fully explained in the following Examples. Unless otherwise stated, all parts and percentages are by weight.

Example 1

Into a 2 liters separable flask fitted with a stirrer, a thermometer, a nitrogen gas inlet tube, a reflux condenser and a dropping funnel, were placed 230 parts of deionized water and 0.6 part of Cation 300 (alkylbenzyl trimethyl amine salt surfactant, trademark of Sanyo Kasei K.K.) and the mixture was heated to 75° C.

To this, were added a solution of 0.5 part of initiator V-50 (2,2'-azobis(2-methyl propionamidine)dihydrochloride, trademark of Wako Junyaku K.K.) in 10 parts of deionized water and then dropwise a monomer mixture of 90 parts of methyl methacrylate and 10 parts of styrene in 45 minutes. After completion of said addition, the combined mixture was maintained at 75° C. for 4 hours to complete polymerization reaction.

The reaction mixture was then subjected to spray-drying to obtain the resinous microparticles of this invention.

Example 2

The same procedures as stated in Example 1 were repeated, and however, in this Example, the reaction mixture was treated with a ultrafiltration apparatus prior to spray-drying to obtain the purified resinous microparticles.

Example 3

Into the similar reacion vessel as used in Example 1 but fitted with two dropping funnels, were placed 220 parts of deionized water and 0.6 part of Cation 300 and the mixture was heated to 75° C.

To this, was added one half of the solution of 1 part of the initiator V-50 in 20 parts of deionized water. Then, from said two dropping funnels, the remaining half of the initiator solution and a monomer mixture of 90 parts of methyl methacrylate and 10 parts of n-butyl methacrylate were simultaneously and dropwise added in 90 minutes. After completion of said addition, the combined mixture was maintained at 75° C. for 2 hours to complete the polymerization reaction.

The reaction mixture was then purified by using an ion exchange resin and subjected to spray-drying to obtain the resinous microparticles of this invention.

Example 4

The same procedures as stated in Example 1 were repeated except for changing the amount of initiator V-50 to 1 part and the monomer composition to a mixture of 85 parts of methyl methacrylate, 10 parts of styrene and 5 parts of ethyleneglycol dimethacrylate to obtain the resinous microparticles of this invention.

Example 5

The same procedures as stated in Example 1 were repeated except for substituting 1 part of initiator VA-058 (2,2'-azobis[2-(3,4,5,6-tetrahydropyrimidin-2-yl)propane] dihydrochloride, trademark of Wako Junyaku K.K.) for 0.5 part of V-50 to obtain the present resinous microparticles.

Example 6

The same procedures as stated in Example 1 were repeated except for substituting 0.5 part of initiator VA-061 (2,2'-azobis[2-(2-imidazolin-2-yl)propane], trademark of Wako Junyaku K.K.) for 0.5 part of V-50 to obtain the present resinous microparticles.

Example 7

The same procedures as stated in Example 1 were repeated except for substituting 1 part of 2,2'-azobis (2-methyl propion amidine)di-p-toluenesulfonate for 0.5 part of V-50 to obtain the present resinous microparticles.

Example 8

The same procedures as stated in Example 1 were repeated except for substituting 1 part of cetylpyridinium chloride for 0.6 part of Cation 300 as cationic surfact to obtain the present resinous microparticles.

Example 9

The same procedures as stated in Example 1 were repeated except for substituting 3 parts of cetylpyridinium chloride for 0.6 part of Cation 300 as cationic surfactant to obtain the present resinous microparticles.

Example 10

Into a similar reaction vessel as used in Example 1, were placed 400 parts of deionized water and 3 parts of Cation 300 (cationic surfactant, alkyl benzyl trimethyl amine, trademark of Sanyo Kasei K.K.) and the mixture was heated to 75° C.

To this, was added a solution of 0.5 part of initiator V-50 (2,2'-azobis(2-methyl propionamidine)dihydrochloride, trademark of Wako Junyaku K.K.) in 10 parts of deionized water, and then a monomer mixture of 90 parts of methyl methacrylate and 10 parts of styrene was added dropwise in 60 minutes thereto.

After completion of said addition, the mixture was maintained at 75° C. for 2 hours to complete polymerization reaction.

The thus obtained reaction mixture was dried by using a spray-drier to obtain the present resinous microparticles.

Example 11

The same procedures as stated in Example 10 were repeated using a monomer mixture of 88 parts of methyl methacrylate, 10 parts of styrene and 2 parts of methacrylic acid to obtain the present resinous microparticles.

Example 12

The same procedures as stated in Example 10 were repeated using a monomer mixture of 87 parts of methyl methacrylate, 10 parts of styrene and 3 parts of methacrylic acid to obtain the present resinous microparticles.

Example 13

The same procedures as stated in Example 10 were repeated using a monomer mixture of 87 parts of methyl methacrylate, 10 parts of styrene and 3 parts of vinyl benzoic acid to obtain the present resinous microparticles.

Example 14

The same procedures as stated in Example 10 were repeated except for substituting 1 part of cetyl pyridinium chloride for 3 parts of Cation 300 as cationic surfactant and revising the monomer composition to a mixture of 88 parts of methyl methacrylate, 10 parts of styrene and 2 parts of methacrylic acid to obtain the present resinous microparticles.

Example 15

Into a similar reaction vessel as used in Example 1, were placed 370 parts of deionized water and 0.6 part of Cation 300 and the mixture was heated to 70° C.

To this, a solution of 2 parts of 2,2-azobis(2-amidinopropane)dihydrochloride in 20 parts of deionized water was added and the combined mixture was allowed to stand for 5 minutes. Thereafter, 15 parts of the solution of 22 parts of 1-(3-sulfopropyl)-2-vinyl pyridinium betaine dissolved in 198 parts of deionized water and 12 parts of the monomer mixture of 126 parts of styrene, 16 parts of n-butyl methacrylate and, 36 parts of n-butyl acrylate were added and after keeping at the same temperature for 10 minutes, the remaining parts of the abovementioned two were added dropwise in 1 hour and the combined mixture was further maintained at the same temperature for 3 hours to obtain an emulsion having a solid content of 25.2%.

Average particle diameter of the emulsion particles was 0.07 μm.

Said emulsion was then subjected to freeze drying to obtain the present microparticles of acrylic resin containing a sulfobetaine group, an amidino group and an ammonium group.

Example 16

Into a similar reaction vessel as used in Example 1, were placed 370 parts of deionized water and 0.4 part of Cation 300 and the mixture was heated to 70° C.

While maintaining the same temperature, was added a solution of 1.4 parts of 2,2-azobis(2-amidinopropane)-dimethane sulfonic acid in 20 parts of deionized water, and after standing for 5 minutes, 15 parts of the solution of 6 parts of N-methyl-N-(vinylbenzyl)taurine in 198 parts of deionized water and 12 parts of the mixture of 152 parts of methyl methacrylate and 42 parts of n-butyl methacrylate were added thereto.

After standing for 10 minutes, the remaining parts of the abovementioned two were added dropwise added in 1 hour and then the combined mixture was maintained at the same temperature for 3 hours to obtain an emulsion having a solid content of 25.0%, average particle diameter of the emulsion particles being 0.1 μm.

The emulsion was then subjected to freeze drying to obtain the microparticles of acrylic resin having aminosulfonic acid group, amidino group and ammonium group.

Example 17

Into a similar reaction vessel as used in Example 1, were placed 350 parts of deionized water and 0.8 part of Cation 300 and the mixture was heated to 75° C.

While maintaining the temperature at 75° C., a solution of 2 parts of 2,2-azobis(2-amidinopropane) in 60 parts of deionized water was added and the mixture was allowed to stand for 5 minutes. Thereafter, a solution of 4 parts of N-(2-hydroxy-3-allyloxypropyl)alanine in 178 parts of deionized water and a monomer mixture of 120 parts of methyl methacrylate, 40 parts of styrene and 36 parts of n-butyl acrylate were simultaneously and added dropwise added in 1 hour and the combined was maintained at the same temperature for 3 hours to obtain an emulsion having a solid content of 25.3% and an average particle diameter of 0.08 μm.

This emulsion was then subjected to freeze drying to obtain the microparticles of an acrylic resin having an amino acid group, an amidino group and an ammonium group.

Comparative Example 1

Into a similar reaction vessel as used in Example 1, 900 parts of deionized water were added and the content was heated to 75° C.

To this, was added 1 part of V-50 dissolved in 10 parts of deionized water and then 20 parts of methyl methacrylate. After stirring for 5 minutes, a monomer mixture of 70 parts of methyl methacrylate and 10 parts of styrene was added dropwise in 45 minutes and the combined mixture was maintained at 75° C. for 4 hours to complete polymerization reaction.

Thus obtained mixture was treated as in Example 1 to obtain the comparative resinous microparticles by the so-called soap-free emulsion polymerization method.

Comparative Example 2

The same procedures as stated in Example 1 were repeated except for substituting 0,5 part of potassium persulfate for 0.5 part of initiator V-50 and changing the polymerization temperature to 80° C.

In this Example, the formed resin began to agglomerate together shortly after the completion of monomer addition and it was unable to obtain the desired resinous microparticles.

Comparative Example 3

The same procedures as stated in Example 1 were repeated except for substituting 5 parts of polyoxyethylene nonyl phenol (nonionic surfactant) for 0.6 part of Cation 300 (cationic surfactant) to obtain the comparative resinous microparticles.

Comparative Example 4

The same procedures as stated in Example 1 were repeated excepting substituting 1 part of potassium persulfate for 0.5 part of initiator V-50, and a mixture of 4 parts of polyoxyethylene nonyl phenol (nonionic surfactant) and 1 part of sodium lauryl sulfate for 0.6 part of Cation 300 (cationic surfactant) to obtain the comparative resinous microparticles comprising 90 parts of methyl methacrylate, 10 parts of styrene and 4 parts of vinyl pyrrolidone.

Experiments (1) Average particle diameters of the resinous microparticles obtained in Example 1~17 (excepting Example 7) and Comparative Examples 1, 3 and 4 were determined by using a scanning type microscope. A light scattering method was used in the determination of the average particle diameter of the resinous microparticles of Example 7.

(2) Tribo value:

0.2 part of the resinous microparticles obtained in the respective Example and 100 parts of reduced iron powder carrier (TEFV 200/300, manufactured by Nippon Iron Powder Co.) were throughly mixed in a ball mill for 1 hour and blow off tribo value of the resulted mixture was determined.

(3) Aerated apparent density:

100 parts of toner prepared by melt-kneading a mixture of styrene-acrylic copolymer and carbon black, pulverizing and shieving and having an aerated apparent density of 0.303 g/cc were mixed well with 1 part of the resinous microparticles obtained in the respective Example, in a Henshel mixer and the aerated apparent density of the resulted toner was determined by using a Powder Tester manufactured by Hosokawa Micron K.K.

The test results are shown in Table 1.

TABLE 1

| | | average particle diameter (μm) | Tribo value (μC/g) | Aerated apparent density (g/cc) |
|---|---|---|---|---|
| Example | 1 | 0.08 | +110 | 0.336 |
| | 2 | 0.08 | +105 | 0.346 |
| | 3 | 0.08 | +190 | 0.335 |
| | 4 | 0.09 | +150 | 0.335 |
| | 5 | 0.08 | +130 | 0.338 |
| | 6 | 0.09 | +50 | 0.335 |
| | 7 | 0.08 | +107 | 0.341 |
| | 8 | 0.1 | +160 | 0.333 |
| | 9 | 0.02 | +109 | 0.329 |
| | 10 | 0.06 | +85 | 0.365 |
| | 11 | 0.07 | +62 | 0.358 |
| | 12 | 0.07 | +43 | 0.359 |
| | 13 | 0.07 | +27 | 0.355 |
| | 14 | 0.06 | +24 | 0.360 |
| | 15 | 0.07 | +95 | 0.351 |
| | 16 | 0.1 | +88 | 0.336 |
| | 17 | 0.08 | +103 | 0.344 |
| Com. Ex. | 1 | 0.3 | +250 | 0.299 |
| | 3 | 0.1 | +10 | 0.305 |
| | 4 | 0.1 | −50 | 0.310 |

As is clear from the test results of Table 1, the present resinous microparticles can give an excellent positive charging characteristics and toner fluidity.

Example 18

6 parts of the toner employed in the Experiment No. 3 and added with the resinous microparticles of Example 1 were mixed with 100 parts of 80 μm iron powder carrier coated with a fluorine-contained resin to give a developing composition. Using the developing composition in a copier SF-8100 (manufactured by Sharp K.K.), continuous copying operations were carried out. Excellent images were obtained up to 20,000 sheets of copies.

Example 19

| Styrene-acrylic resin | 100 parts |
|---|---|
| carbon black | 8 parts |
| nigrosine | 5 parts |
| low molecular weight polypropylene wax | 4 parts |

The abovementioned composition was melt-kneaded in a pressurized kneader, pulverized and sieved to obtain colored particles having an average particle diameter of 12 μm.

To 100 parts of thus obtained colored particles, was mixed 0.5 parts of the resinous microparticles of Example 10 by using Henshel mixer to obtain the present toner composition.

Example 20

The procedures stated in Example 19 were repeated excepting substituting 0.5 part of the resinous microparticles of Example 11 for 0.5 part of the resinous microparticles of Example 10 to obtain the present toner composition.

Example 21

The same procedures as stated in Example 19 were repeated except for substituting the same amount of resinous microparticles of Example 12 for the particles of Example 10 to obtain the present toner composition.

Example 22

The same procedures as stated in Example 19 were repeated except for substituting the same amount of resinous microparticles of Example 13 for the microparticles of Example 10 to obtain the present toner composition.

Example 23

The same procedures as stated in Example 19 were repeated except for substituting the same amount of resinous microparticles of Example 14 for the microparticles of Example 10 to obtain the present toner composition.

Example 24

The same procedures as stated in Example 19 were repeated except for increasing the amount of resinous microparticles of Example 10 from 0.5 part to 4 parts to obtain the present toner composition.

Example 25

The same procedures as stated in Example 19 were repeated except for substituting 2 parts of the resinous microparticles of Example 14 for 0.5 part of the microparticles of Example 10 to obtain the present toner composition.

Example 26

The same procedures as stated in Example 19 were repeated except for substituting 1 part of the resinous microparticles of Example 15 for 0.5 part of the microparticles of Example 10 to obtain the present toner composition.

Example 27

The same procedures as stated in Example 19 were repeated except for substituting 2 parts of the resinous microparticles of Example 16 for 0.5 part of the microparticles of Example 10 to obtain the present toner composition.

Example 28

The same procedures as stated in Example 19 were repeated except for substituting 3 parts of the resinous microparticles of Example 17 for 0.5 part of the microparticles of Example 10 to obtain the present toner composition.

Comparative Example 5

In this Example, the colored particles stated in Example 19 were used as they were as toner, without adding with the resinous microparticles of Example 10.

Comparative Example 6

The same procedures as stated in Example 19 were repeated except for substituting 0.5 part of alumina (manufactured by Nippon Aerosil K.K. AOC) for 0.5 part of the resinous microparticles of Example 10 to obtain the comparative toner.

Comparative Example 7

The same procedures as stated in Example 19 were repeated except for substituting 0.5 part of Aerosil R972 (manufactured by Nippon Aerosil K.K.) for 0.5 part of the resinous microparticles of Example 10 to obtain the comparative toner.

Experiment (4) Aerated apparent densities of the toners obtained in Examples 19~25 and Comparative Examples 5~7 were measured by using Powder Tester manufactured by Hosokawa Micron K.K.

(5) Each 5 parts of the toner obtained in the respective Example were mixed with 100 parts of iron powder carrier coated with fluorine containing resin.

Tribo values of the toner were measured by using Blow off tester manufactured by Toshiba Chemical K.K. at three different stages after elapsing 3, 20 and 60 minutes mixing times.

The test results are shown in Table 2.

TABLE 2

| | | Aerated apparent density (g/cc) | Tribo value ($\mu$C/g) | | |
|---|---|---|---|---|---|
| | | | 3 min. | 20 min. | 60 min. |
| Example | 19 | 0.340 | +23.0 | +26.0 | +29.0 |
| | 20 | 0.345 | +22.0 | +23.3 | +23.4 |
| | 21 | 0.339 | +21.5 | +22.5 | +22.5 |
| | 22 | 0.342 | +21.0 | +22.0 | +22.3 |
| | 23 | 0.350 | +21.0 | +21.5 | +21.5 |
| | 24 | 0.360 | +30.0 | +34.0 | +34.2 |
| | 25 | 0.362 | +32.0 | +32.2 | +32.2 |
| Com. Ex. | 5 | 0.298 | +18.0 | +22.0 | +22.2 |
| | 6 | 0.345 | +8.8 | +10.5 | +12.8 |
| | 7 | 0.350 | −2.5 | −0.2 | +2.5 |

As clearly shown in Table 2, the present toner can exhibit excellent flowability and well is electrificated with a positive charge.

Furthermore, as is clear from the test results of Examples 20~23, when the toner is added with microparticles of the resin having carboxyl groups in the molecule, there is only a minor change in the tribo values at different mixing times and thus, the toner is excellent in respect to the cyclic stability of the charging.

Next, the toner compositions of Examples 26~28, Example 19 and Comparative Examples 5,~6 each was subjected to mixing in a ball mill under three different atmospheric conditions (i.e. temp. 22° C. and relative humidity 55%; temp. 35° C. and relative humidity 85%; and temperature 10° C. and relative humidity 30%) for 20 minutes and the tribo values were measured each time.

The test results obtained are shown in Table 3.

TABLE 3

| | | Aerated apparent density (g/cc) | Tribo value ($\mu$C/g) | | |
|---|---|---|---|---|---|
| | | | 22° C. 55% RH | 35° C. 85% RH | 10° C. 30% RH |
| Example | 19 | 0.340 | +26.0 | +21.2 | +31.1 |
| | 26 | 0.347 | +25.6 | +23.0 | +27.4 |
| | 27 | 0.351 | +27.3 | +24.9 | +29.0 |
| | 28 | 0.355 | +29.8 | +26.7 | +31.3 |
| Com. Ex. | 5 | 0.298 | +22.0 | +15.6 | +30.2 |
| | 6 | 0.345 | +10.5 | +7.0 | +14.3 |

As is clear from the test results shown in Table 3, when the microparticles are composed of a resin having an amphoionic group in its molecule, the present toner added with such resinous microparticles can exhibit excellent atmospheric stability, showing only minor changes in the tribo values under different mixing conditions.

When continuous copying operations were carried out with these toners, excellent copy-images were obtained under different atmospheric conditions.

What is claimed is:

1. Resinous microparticles useful in toners for electrophotography which are made of vinyl resin obtained by emulsion polymerization of at least one $\alpha, \beta$-ethylenically unsaturated monomers in the presence of cationic surfactant having an onium salt structure and a polymerization initiator having an amidine or amidine salt structure and whose average particle diameter is in a range of from 0.01 to $1\mu$.

2. Resinous microparticles according to claim 1 wherein a carboxyl group bearing monomer is used as a part of said $\alpha, \beta$-ethylenically unsaturated monomers.

3. Resinous microparticles according to claim 1 wherein an amphoionic group bearing monomer is used as a part of said $\alpha, \beta$-ethylenically unsaturated monomers.

4. A toner composition for electrophotographic use which contains a toner and is characterized by containing 0.01 to 5% the resinous microparticles of claim 1, 2 or 3, by weight of the total toner weight.

* * * * *